US009388729B2

(12) United States Patent
Himoto et al.

(10) Patent No.: US 9,388,729 B2
(45) Date of Patent: Jul. 12, 2016

(54) HYDRAULIC EXCAVATOR

(71) Applicant: KOMATSU LTD., Tokyo (JP)

(72) Inventors: Manabu Himoto, Kyotanabe (JP); Osamu Nishimura, Joyo (JP); Tadashi Mori, Hirakata (JP)

(73) Assignee: KOMATSU LTD., Tokyo (JP)

(*) Notice: Subject to any disclaimer, the term of this patent is extended or adjusted under 35 U.S.C. 154(b) by 252 days.

(21) Appl. No.: 14/234,835

(22) PCT Filed: Nov. 20, 2012

(86) PCT No.: PCT/JP2012/080012

§ 371 (c)(1),
(2) Date: Jan. 24, 2014

(87) PCT Pub. No.: WO2014/061170

PCT Pub. Date: Apr. 24, 2014

(65) Prior Publication Data

US 2015/0330056 A1 Nov. 19, 2015

(30) Foreign Application Priority Data

Oct. 16, 2012 (JP) ................................ 2012-228794

(51) Int. Cl.
*E02F 9/08* (2006.01)
*F01N 13/18* (2010.01)
(Continued)

(52) U.S. Cl.
CPC .......... *F01N 13/1805* (2013.01); *E02F 9/0866* (2013.01); *F01N 3/035* (2013.01); *F01N 3/2066* (2013.01); *F01N 13/1816* (2013.01); *F02B 61/00* (2013.01); *F01N 2590/08* (2013.01)

(58) Field of Classification Search
CPC . F01N 13/18; F01N 13/1805; F01N 13/1811; F01N 13/1816; F01N 13/1822; F01N 3/021; F01N 3/033; F01N 3/2066; F01N 3/035; F01N 13/00; E02F 9/0866; E02F 9/08; E02F 9/0858; B60K 13/04; B60Y 2200/412
See application file for complete search history.

(56) References Cited

U.S. PATENT DOCUMENTS

2005/0173095 A1* 8/2005 Fujita ................ B60H 1/00378
165/77

(Continued)

FOREIGN PATENT DOCUMENTS

| | | | |
|---|---|---|---|
| JP | 2012-2016 | A | 1/2012 |
| JP | 2012-97413 | A | 5/2012 |
| WO | 2011/152306 | A1 | 12/2011 |

OTHER PUBLICATIONS

The International Search Report for the corresponding international application No. PCT/JP2012/080012, issued on Mar. 5, 2013.

(Continued)

*Primary Examiner* — John Walters
*Assistant Examiner* — Brian Swenson
(74) *Attorney, Agent, or Firm* — Global IP Counselors, LLP

(57) ABSTRACT

A hydraulic excavator includes an engine, a revolving frame supporting the engine, a vehicle body frame, a first exhaust treatment apparatus and a connecting pipe. The vehicle body frame includes a plurality of column members disposed upright on the revolving frame. The first exhaust treatment apparatus is supported by the vehicle body frame and treats exhaust from the engine. The connecting pipe connects the engine and the first exhaust treatment apparatus. At least a portion of the connecting pipe includes an extendable and contractable bellows portion. The connecting pipe includes a fixing portion fixed to the vehicle body frame. The fixing portion is positioned in the connecting pipe between the bellows portion and the first exhaust treatment apparatus.

20 Claims, 7 Drawing Sheets

(51) Int. Cl.

| | |
|---|---|
| ***F02B 61/00*** | (2006.01) |
| ***F01N 3/20*** | (2006.01) |
| ***F01N 3/035*** | (2006.01) |

(56) References Cited

U.S. PATENT DOCUMENTS

| | | | | |
|---|---|---|---|---|
| 2006/0013746 | A1* | 1/2006 | Bien | F01N 3/2882 422/179 |
| 2010/0187383 | A1* | 7/2010 | Olsen | F01N 13/1805 248/201 |
| 2011/0000199 | A1* | 1/2011 | Ezawa | B01D 46/0002 60/311 |
| 2011/0074150 | A1 | 3/2011 | Drost et al. | |
| 2012/0247861 | A1 | 10/2012 | Mizuno et al. | |
| 2012/0312954 | A1* | 12/2012 | Rodecker | F01N 13/1822 248/617 |

OTHER PUBLICATIONS

The Chinese Office Action for the corresponding Chinese application No. 201280041362.4, issued on Nov. 3, 2014.

* cited by examiner

HYDRAULIC EXCAVATOR

CROSS-REFERENCE TO RELATED APPLICATIONS

This application is a U.S. National stage application of International Application No. PCT/JP2012/080012, filed on Nov. 20, 2012. This U.S. National stage application claims priority under 35 U.S.C. §119(a) to Japanese Patent Application No. 2012-228794, filed in Japan on Oct. 16, 2012, the entire contents of which are hereby incorporated herein by reference.

BACKGROUND

1. Field of the Invention

The present invention relates to a hydraulic excavator.

2. Background Information

An exhaust treatment apparatus is mounted onto a hydraulic excavator. The exhaust treatment apparatus is connected with an engine via a connecting pipe in order to treat exhaust from the engine. For example, as an example of the exhaust treatment apparatus, there is a diesel particulate filter apparatus. The diesel particulate filter apparatus reduces particulate matter in exhaust.

When the exhaust treatment apparatus is attached to the engine such that the exhaust treatment apparatus is supported by the engine, a heavy weight is arranged on the upper portion of the engine. As a result, the load on a bracket for attaching the exhaust treatment apparatus to the engine is increased. When the bracket is enlarged in order to strengthen the bracket, the weight of the bracket is increased.

Accordingly, it is preferable that the exhaust treatment apparatus be attached to a support other than the engine. For example, a table is arranged on an upper frame via supporting legs in Japan Patent Laid-open Patent Publication JP-A-2012-097413. A diesel particulate filter apparatus and a selective catalytic reduction apparatus are arranged on an upper surface of the table.

When the support is arranged on the upper frame as in Japan Patent Laid-open Patent Publication JP-A-2012-097413, the exhaust treatment apparatus is significantly affected by vibration from the upper frame. In contrast to this, the connecting pipe which connects the exhaust treatment apparatus and the engine is significantly affected by vibration of the engine. As a result, a load acts on the connecting pipe due to the difference in vibration between the engine and the support.

It is possible for the difference in vibration described above to be absorbed by providing a bellows portion in the connecting pipe. However, when the bellows portion is provided in the connecting pipe, the connecting pipe changes shape in a flexible manner in the bellows portion. Accordingly, in a state where the connecting pipe is a cantilever, it is difficult to hold the end portion of the connecting pipe at a constant position. In particular, it is preferable that the length of the bellows portion be increased in order to increase the vibration absorption capability of the bellows portion. However, when the length of the bellows portion is large, it is more difficult to hold the end portion of the connecting pipe at a constant position. As a result, an operation where the connecting pipe is connected with the exhaust treatment apparatus is difficult. Alternatively, an operation where the connecting pipe is detached from the exhaust treatment apparatus is difficult.

An object of the present invention is to provide a hydraulic excavator where it is possible to reduce the load on a connecting pipe due to vibration and where it is possible to eliminate difficulties when attaching and detaching the connecting pipe with regard to an exhaust treatment apparatus.

A hydraulic excavator according to a first aspect of the present invention is provided with an engine, a revolving frame, a vehicle body frame, a first exhaust treatment apparatus, and a connecting pipe. The revolving frame supports the engine. The vehicle body frame includes a plurality of column members which are disposed upright on the revolving frame. The first exhaust treatment apparatus is supported by the vehicle body frame. The first exhaust treatment apparatus treats exhaust from the engine. At least a portion of the connecting pipe has a bellows portion which is able to extend and contract. The connecting pipe connects the engine and the first exhaust treatment apparatus. The connecting pipe includes a fixing portion which is fixed to the vehicle body frame. The fixing portion is positioned in the connecting pipe between the bellows portion and the first exhaust treatment apparatus.

A hydraulic excavator according to a second aspect of the present invention is the hydraulic excavator according to the first aspect, where a connecting portion of the connecting pipe and the first exhaust treatment apparatus is positioned below the first exhaust treatment apparatus.

A hydraulic excavator according to a third aspect of the present invention is the hydraulic excavator according to the second aspect, where the fixing portion is positioned below the connecting portion.

A hydraulic excavator according to a fourth aspect of the present invention is the hydraulic excavator according to any of the first to third aspects, where the fixing portion and the first exhaust treatment apparatus are attached to the same member in the vehicle body frame.

A hydraulic excavator according to a fifth aspect of the present invention is the hydraulic excavator according to any of the first to third aspects, where the vehicle body frame further includes a beam member to which the first exhaust treatment apparatus is attached. The fixing portion is fixed to the beam member.

A hydraulic excavator according to a sixth aspect of the present invention is the hydraulic excavator according to any of the first to third aspects, which is further provided with an attachment member for attaching the fixing portion to the vehicle body frame. The attachment member includes a first plate portion and a second plate portion. The attachment member has a shape which is bent between the first plate portion and the second plate portion. The first plate portion and the fixing portion are configured to be attached to each other so as to be able to be positionally adjusted. The second plate portion and the vehicle body frame are configured to be attached to each other so as to be able to be positionally adjusted.

A hydraulic excavator according to a seventh aspect of the present invention is the hydraulic excavator according to any of the first to third aspects, which is further provided with a second exhaust treatment apparatus. The second exhaust treatment apparatus is supported by the vehicle body frame. The second exhaust treatment apparatus treats exhaust from the engine. The engine, the second exhaust treatment apparatus, and the first exhaust treatment apparatus are arranged so as to line up in a first direction on a horizontal plane in a planar view in order of the engine, the second exhaust treatment apparatus, and the first exhaust treatment apparatus.

A hydraulic excavator according to an eighth aspect of the present invention is the hydraulic excavator according to the seventh aspect, where the connecting pipe is connected with the first exhaust treatment apparatus by passing below the second exhaust treatment apparatus.

A hydraulic excavator according to a ninth aspect of the present invention is the hydraulic excavator according to the seventh aspect, which is further provided with a bracket for attaching the first exhaust treatment apparatus to the vehicle body frame. The first exhaust treatment apparatus and the second exhaust treatment apparatus are attached to the vehicle body frame in an integral manner via the bracket.

A hydraulic excavator according to a tenth aspect of the present invention is the hydraulic excavator according to the seventh aspect, where the first exhaust treatment apparatus and the second exhaust treatment apparatus are arranged to line up in a state where the longitudinal directions of the first exhaust treatment apparatus and the second exhaust treatment apparatus are perpendicular with the first direction. The length of the bellows portion is larger than the dimension of the first exhaust treatment apparatus in the first direction or the dimension of the second exhaust treatment apparatus in the first direction.

A hydraulic excavator according to an eleventh aspect of the present invention is the hydraulic excavator according to the tenth aspect, where the second exhaust treatment apparatus has a cylindrical shape. The length of the bellows portion is larger than the diameter of the second exhaust treatment apparatus.

A hydraulic excavator according to a twelfth aspect of the present invention is the hydraulic excavator according to the tenth aspect, where the first exhaust treatment apparatus has a cylindrical shape. The length of the bellows portion is larger than the diameter of the first exhaust treatment apparatus.

A hydraulic excavator according to a thirteenth aspect of the present invention is the hydraulic excavator according to the seventh aspect, where the first exhaust treatment apparatus and the second exhaust treatment apparatus are arranged to line up in a state where the longitudinal directions of the first exhaust treatment apparatus and the second exhaust treatment apparatus are perpendicular with the first direction. The length of the connecting pipe in the first direction is larger than the distance between the center of the first exhaust treatment apparatus in the first direction and the center of the second exhaust treatment apparatus in the first direction.

A hydraulic excavator according to a fourteenth aspect of the present invention is the hydraulic excavator according to the seventh aspect, where the second exhaust treatment apparatus is a selective catalytic reduction apparatus.

A hydraulic excavator according to a fifteenth aspect of the present invention is the hydraulic excavator according to any of the first to third aspects, where the first exhaust treatment apparatus is a diesel particulate filter apparatus.

In the hydraulic excavator according to the first aspect of the present invention, it is possible to absorb a difference in vibration between the engine and the vehicle body frame using the bellows portion of the connecting pipe. Due to this, the load on the connecting pipe is reduced. In addition, the connecting pipe is fixed to the vehicle body frame at the fixing portion between the bellows portion and the first exhaust treatment apparatus. As a result, it is easy to hold the end portion of the connecting pipe at a constant position even in a state where the end portion of the connecting pipe is not connected with the first exhaust treatment apparatus. Due to this, an operation where the connecting pipe is attached and detached with regard to the exhaust treatment apparatus is easy.

In the hydraulic excavator according to the second aspect of the present invention, the connecting portion of the connecting pipe and the first exhaust treatment apparatus is positioned below the first exhaust treatment apparatus. Accordingly, it is possible to detach the first exhaust treatment apparatus from the vehicle by lifting up the first exhaust treatment apparatus while maintaining a state where the connecting pipe is attached to the vehicle body frame.

In the hydraulic excavator according to the third aspect of the present invention, the fixing portion is positioned below the connecting portion. Accordingly, the distance from the fixing portion up to the end portion of the connecting pipe which is connected with the first exhaust treatment apparatus is short. As a result, it is easier to hold the end portion of the connecting pipe at a constant position.

In the hydraulic excavator according to the fourth aspect of the present invention, the fixing portion and the first exhaust treatment apparatus are attached to the same member in the vehicle body frame. As a result, it is possible to reduce errors in the positions of the end portion of the connecting pipe and the first exhaust treatment apparatus.

In the hydraulic excavator according to the fifth aspect of the present invention, the fixing portion is fixed to a beam member in the same manner as the first exhaust treatment apparatus. Accordingly, the distance from the fixing portion up to the end portion of the connecting pipe which is connected with the first exhaust treatment apparatus is short. As a result, it is easier to hold the end portion of the connecting pipe at a constant position.

In the hydraulic excavator according to the sixth aspect of the present invention, it is possible to adjust the position of the fixing portion in a plurality of directions by adjusting the position of the first plate portion and adjusting the position of the second plate portion. As a result, there is a high degree of freedom in positional alignment of the fixing portion. Due to this, the operation where the connecting pipe is attached and detached with regard to the first exhaust treatment apparatus is easier.

In the hydraulic excavator according to the seventh aspect of the present invention, the engine, the second exhaust treatment apparatus, and the first exhaust treatment apparatus are arranged to line up a planar view in this order in the first direction. That is, the first exhaust treatment apparatus is positioned to be further from the engine than the second exhaust treatment apparatus. Accordingly, it is possible to ensure that the lengths of the connecting pipe and the bellows portion are large. Due to this, it is possible to further reduce the load on the connecting pipe due to vibration.

In the hydraulic excavator according to the eighth aspect of the present invention, the connecting pipe passes below the second exhaust treatment apparatus. Accordingly, it is difficult for the connecting pipe to interfere with the second exhaust treatment apparatus when detaching the second exhaust treatment apparatus from the vehicle by lifting up the second exhaust treatment apparatus.

In the hydraulic excavator according to the ninth aspect of the present invention, the first exhaust treatment apparatus and the second exhaust treatment apparatus are made into a unit using the bracket. Accordingly, it is possible to attach and detach the first exhaust treatment apparatus and the second exhaust treatment apparatus to and from the vehicle body frame integrally as a unit. In addition, when attaching and detaching the unit with regard to the vehicle body frame, the end portion of the connecting pipe is held at a constant position by the fixing portion. Due to this, when the unit is attached to the vehicle body frame, the operation where the connecting pipe is connected with the first exhaust treatment apparatus is easy. Alternatively, when the unit is detached from the vehicle body frame, the operation where the connecting pipe is detached from the first exhaust treatment apparatus is easy.

In the hydraulic excavator according to the tenth aspect of the present invention, it is ensured that the length of the bellows portion is large. Due to this, it is possible to further reduce the load on the connecting pipe due to vibration.

In the hydraulic excavator according to the eleventh aspect of the present invention, it is ensured that the length of the bellows portion is large. Due to this, it is possible to further reduce the load on the connecting pipe due to vibration.

In the hydraulic excavator according to the twelfth aspect of the present invention, it is ensured that the length of the bellows portion is large. Due to this, it is possible to further reduce the load on the connecting pipe due to vibration.

In the hydraulic excavator according to the thirteenth aspect of the present invention, it is ensured that the length of the bellows portion is large. Due to this, it is possible to further reduce the load on the connecting pipe due to vibration.

In the hydraulic excavator according to the fourteenth aspect of the present invention, pollutants such as nitrogen oxide NOx in the exhaust are purified by the second exhaust treatment apparatus.

In the hydraulic excavator according to the fifteenth aspect of the present invention, particulate matter which is included in the exhaust is captured by the first exhaust treatment apparatus. In addition, the diesel particulate filter apparatus is frequently maintained. Accordingly, it is possible to improve maintainability of the first exhaust treatment apparatus due to the operation where the connecting pipe is attached and detached with regard to the first exhaust treatment apparatus being easy.

DETAILED DESCRIPTION OF THE EMBODIMENT(S)

Figure 1:
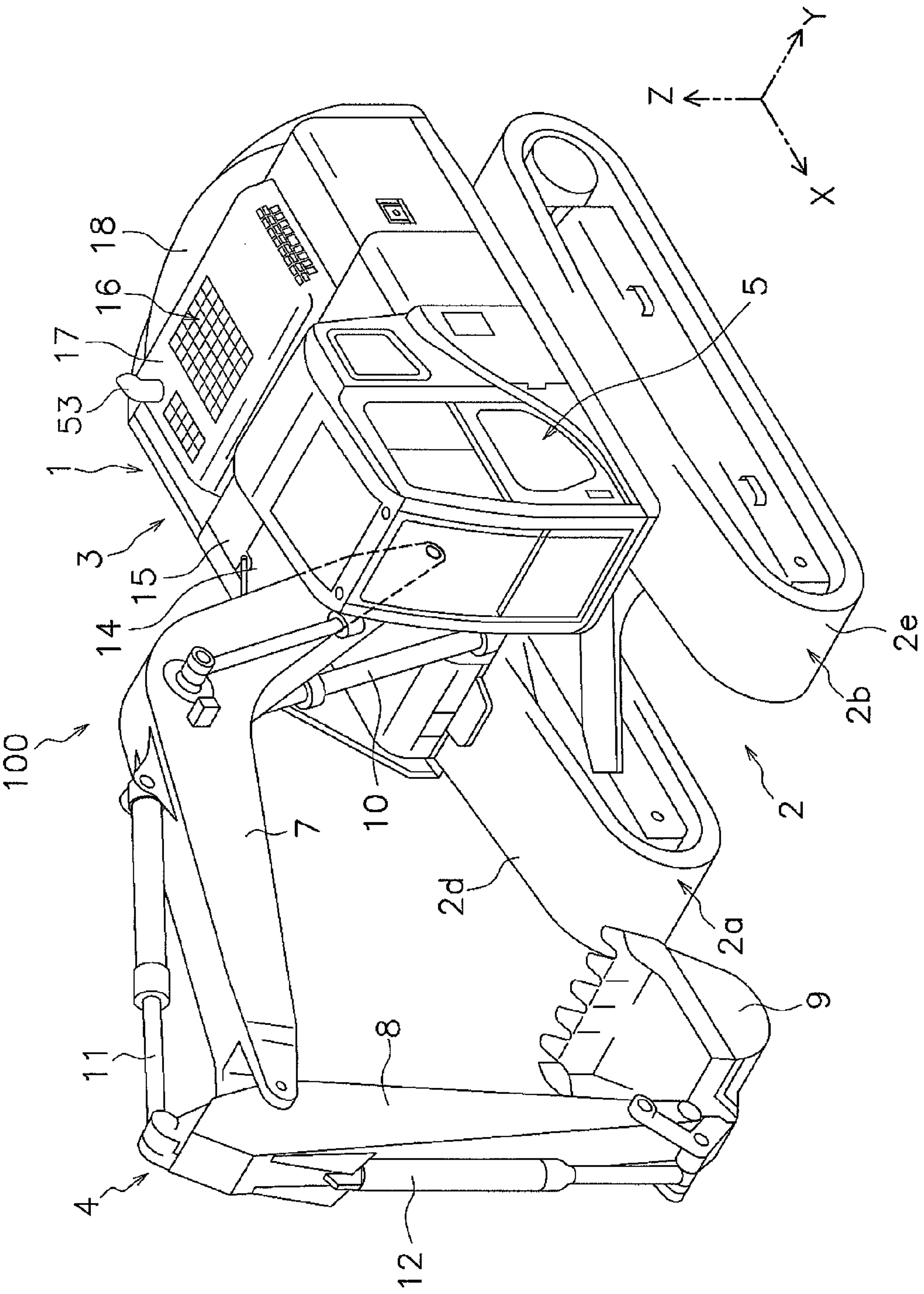
FIG. 1 is a perspective view of a hydraulic excavator according to an exemplary embodiment of the present invention.

A hydraulic excavator 100 according to an embodiment of the present invention is shown in FIG. 1. The hydraulic excavator 100 is provided with a vehicle body 1 and a work implement 4. The vehicle body 1 has a traveling unit 2 and a revolving unit 3. The traveling unit 2 has a pair of traveling apparatuses **2*a* and 2*b*. Each of the traveling apparatuses 2*a* and 2*b* has crawler tracks 2*d* and 2*e*. The traveling apparatuses 2*a* and 2*b* move the hydraulic excavator 100 by the crawler tracks 2*d* and 2*e* being driven using driving force from an engine 21 (refer to FIG. 2**) which will be described later.

Here, in the following description, the front and back direction has the meaning of the front and back direction of the vehicle body 1. In other words, the front and back direction is the direction to the front and back when viewed by an operator who is seated in a cab 5. In addition, the left and right direction or the lateral direction has the meaning of the vehicle width direction of the vehicle body 1. In other words, the left and right direction, the vehicle width direction, or the lateral direction are the direction to the left and right when viewed by the operator described above. In addition, the front and back direction is shown as the x axis, the left and right direction is shown as the y axis, and the up and down direction is shown as the z axis in the diagrams.

The revolving unit 3 is mounted onto the traveling unit 2. The revolving unit 3 is provided to be able to revolve with regard to the traveling unit 2. In addition, the cab 5 is provided on the revolving unit 3. The revolving unit 3 has a fuel tank 14, a hydraulic fluid tank 15, an engine compartment 16, and a counterweight 18. The fuel tank 14 retains fuel for driving the engine 21 which will be described later. The fuel tank 14 is arranged in front of the hydraulic fluid tank 15. The hydraulic fluid tank 15 retains hydraulic fluid which is discharged from a hydraulic pump 23 (refer to FIG. 2) which will be described later. The hydraulic fluid tank 15 is arranged to line up with the fuel tank 14 in the front and back direction.

The engine compartment 16 accommodates equipment such as the engine 21 and the hydraulic pump 23 which will be described later. The engine compartment 16 is arranged behind the cab 5, the fuel tank 14, and the hydraulic fluid tank 15. The engine compartment 16 is covered by an engine hood 17 from above. The counterweight 18 is arranged behind the engine compartment 16.

The work implement 4 is attached to a center position of a front portion of the revolving unit 3. The work implement 4 has a boom 7, an arm 8, a bucket 9, a boom cylinder 10, an arm cylinder 11, and a bucket cylinder 12. The base end portion of the boom 7 is rotatably joined to the revolving unit 3. In addition, the front end portion of the boom 7 is rotatably joined to the base end portion of the arm 8. The front end portion of the arm 8 is rotatably joined to the bucket 9. The boom cylinder 10, the arm cylinder 11, and the bucket cylinder 12 are hydraulic cylinders and are driven using hydraulic fluid which is discharged from the hydraulic pump 23 which will be described later. The boom cylinder 10 operates the boom 7. The arm cylinder 11 operates the arm 8. The bucket cylinder 12 operates the bucket 9. The work implement 4 is driven by the driving of the cylinders 10, 11 and 12.

Figure 2:
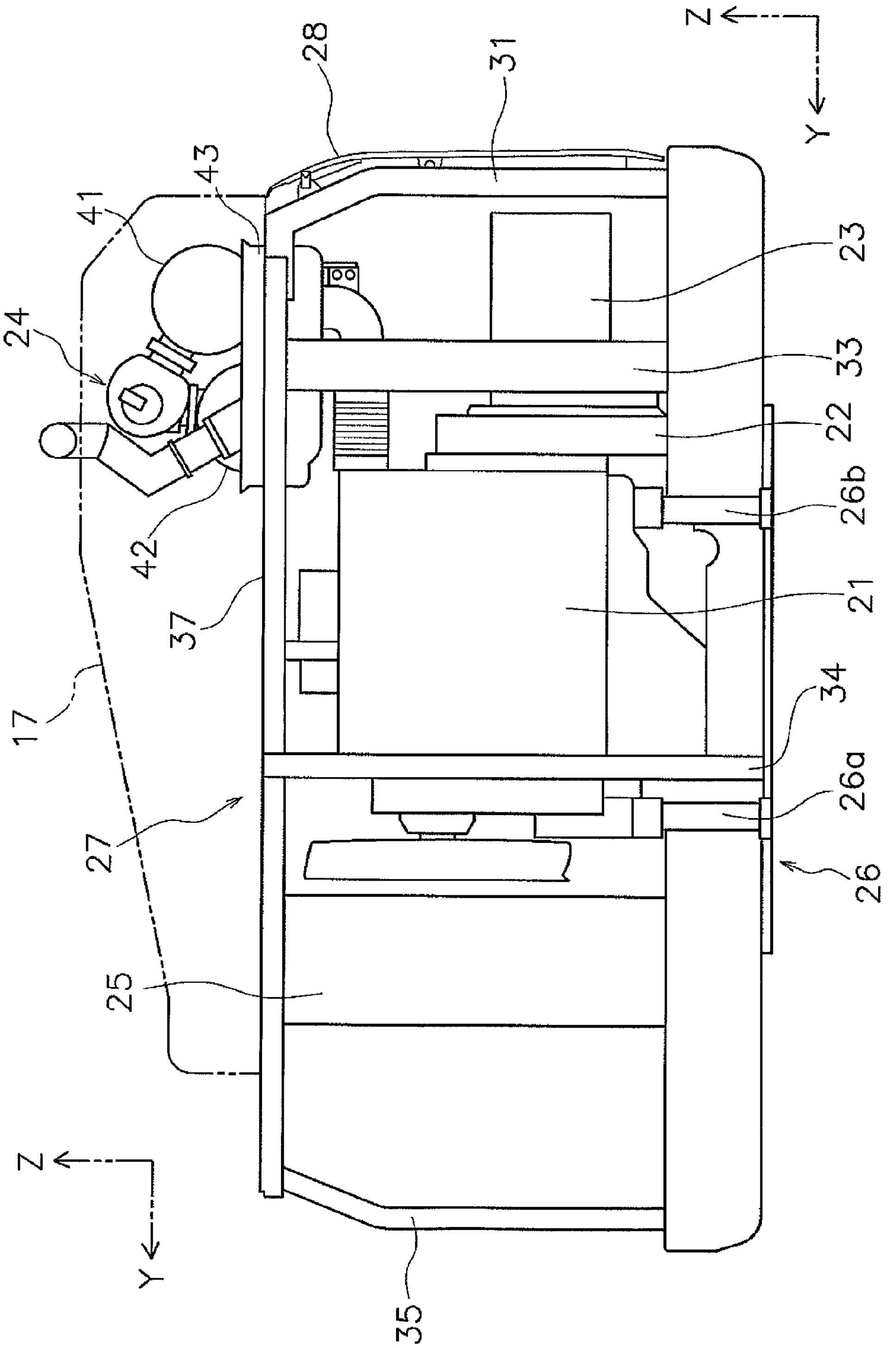
FIG. 2 is a diagram of an inner configuration of an engine compartment in the hydraulic excavator viewed from rear.
Figure 3:
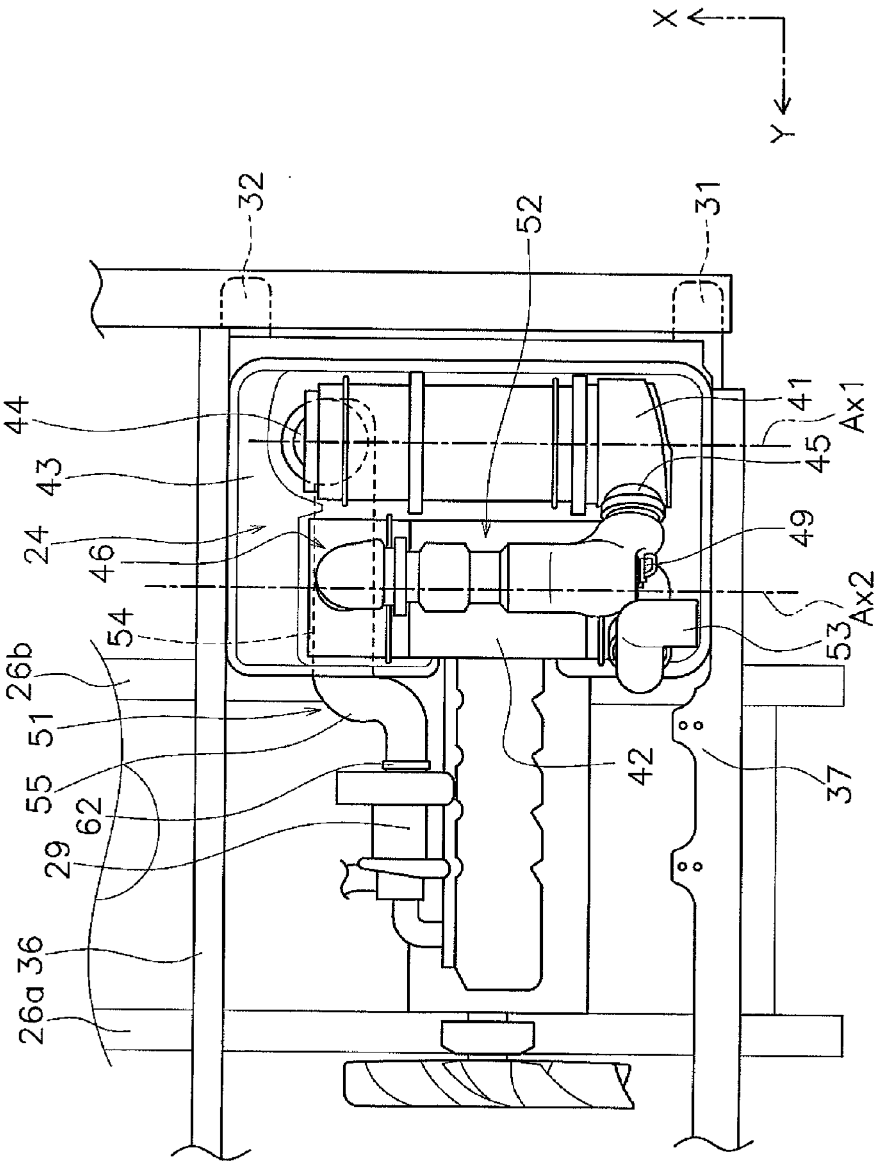
FIG. 3 is a plan view of the inner configuration of the engine compartment.

FIG. 2 is a diagram of the inner configuration of the engine compartment 16 viewed from behind. FIG. 3 is a plan view illustrating the inner configuration of the engine compartment 16. As shown in FIG. 2, the engine 21, a flywheel housing 22, the hydraulic pump 23, and an exhaust treatment unit 24 are arranged in the engine compartment 16. In addition, a cooling apparatus 25 which includes a radiator and/or an oil cooler is arranged in the engine compartment 16. The cooling apparatus 25, the engine 21, the flywheel housing 22, and the hydraulic pump 23 are arranged to line up in the vehicle width direction.

As shown in FIG. 2, the hydraulic excavator 100 has a revolving frame 26 and a vehicle body frame 27. The revolving frame 26 includes a pair of center frames **26*a* and 26*b* which extend in the front and back direction. The revolving frame 26 supports the engine 21** via a rubber damper.

The vehicle body frame 27 is disposed upright on the revolving frame 26. The vehicle body frame 27 is arranged in the surroundings of the equipment such as the engine 21 and the hydraulic pump 23. An outer cover 28 is attached to the vehicle body frame 27. Here, only a portion of the outer cover 28 is shown in FIG. 2. The engine hood 17 shown in FIG. 1 is also attached to the vehicle body frame 27.

As shown in FIG. 2 and FIG. 3, the vehicle body frame 27 includes a plurality of column members 31 to 35 and a plurality of beam members 36 and 37. The column members 31 to 35 are arranged so as to extend upward from the revolving frame 26. The beam members 36 and 37 are supported by the column members 31 to 35. In detail, the plurality of beam members 36 and 37 include a first beam member 36 and a second beam member 37 as shown in FIG. 3. The first beam member 36 and the second beam member 37 are arranged to be separated from each other in the front and back direction. The first beam member 36 is arranged forward of the engine 21. The second beam member 37 is arranged rearward of the engine 21.

The hydraulic pump 23 is driven by the engine 21. As shown in FIG. 2, the hydraulic pump 23 is arranged at the lateral side of the engine 21. That is, the hydraulic pump 23 is arranged to line up with the engine 21 in the vehicle width direction. The hydraulic pump 23 is arranged at a position which is lower than the upper surface of the engine 21.

The flywheel housing 22 is arranged between the engine 21 and the hydraulic pump 23. The flywheel housing 22 is attached to the side surface of the engine 21. In addition, the hydraulic pump 23 is attached to the side surface of the flywheel housing 22.

The exhaust treatment unit 24 has a first exhaust treatment apparatus 41, a second exhaust treatment apparatus 42, and a bracket 43. The exhaust treatment unit 24 is arranged above the hydraulic pump 23. The exhaust treatment unit 24 is arranged to span between the first beam member 36 and the second beam member 37. The exhaust treatment unit 24 is supported by the beam members 36 and 37. That is, the first exhaust treatment apparatus 41 and the second exhaust treatment apparatus 42 are supported by the vehicle body frame 27.

The first exhaust treatment apparatus 41 is an apparatus which treats the exhaust gas from the engine 21. The first exhaust treatment apparatus 41 is a diesel particulate filter apparatus. Accordingly, the first exhaust treatment apparatus 41 captures particulate matter which is included in the exhaust using a filter. The first exhaust treatment apparatus 41 incinerates the captured particulate matter using a heater which is attached to the filter.

The first exhaust treatment apparatus 41 substantially has a cylindrical shape. As shown in FIG. 3, the first exhaust treatment apparatus 41 is arranged such that a center axis Ax1 of the first exhaust treatment apparatus 41 is along the front and back direction. Accordingly, the first exhaust treatment apparatus 41 is arranged such that the center axis Ax1 of the first exhaust treatment apparatus 41 is perpendicular with regard to a direction (referred to below as the first direction) where the engine 21 and the hydraulic pump 23 are lined up. In other words, the first exhaust treatment apparatus 41 is arranged in a state where the longitudinal direction of the first exhaust treatment apparatus 41 is perpendicular with regard to the first direction. In addition, the center axis Ax1 of the first exhaust treatment apparatus 41 is parallel with a center axis Ax1 of the second exhaust treatment apparatus 42.

The engine 21, the second exhaust treatment apparatus 42, and the first exhaust treatment apparatus 41 are arranged such that the respective projections of the engine 21, the second exhaust treatment apparatus 42, and the first exhaust treatment apparatus 41 with regard to the horizontal plane are lined up in the first direction on the horizontal plane in the order of the engine 21, the second exhaust treatment apparatus 42, and the first exhaust treatment apparatus 41. The first direction is the vehicle width direction in the present embodiment. That is, as shown in FIG. 3, the engine 21, the second exhaust treatment apparatus 42, and the first exhaust treatment apparatus 41 are arranged to line up in this order in the first direction, that is, the vehicle width direction in a planar view of the vehicle. Accordingly, the first exhaust treatment apparatus 41 is positioned to be further from the engine 21 than the second exhaust treatment apparatus 42.

Figure 4:
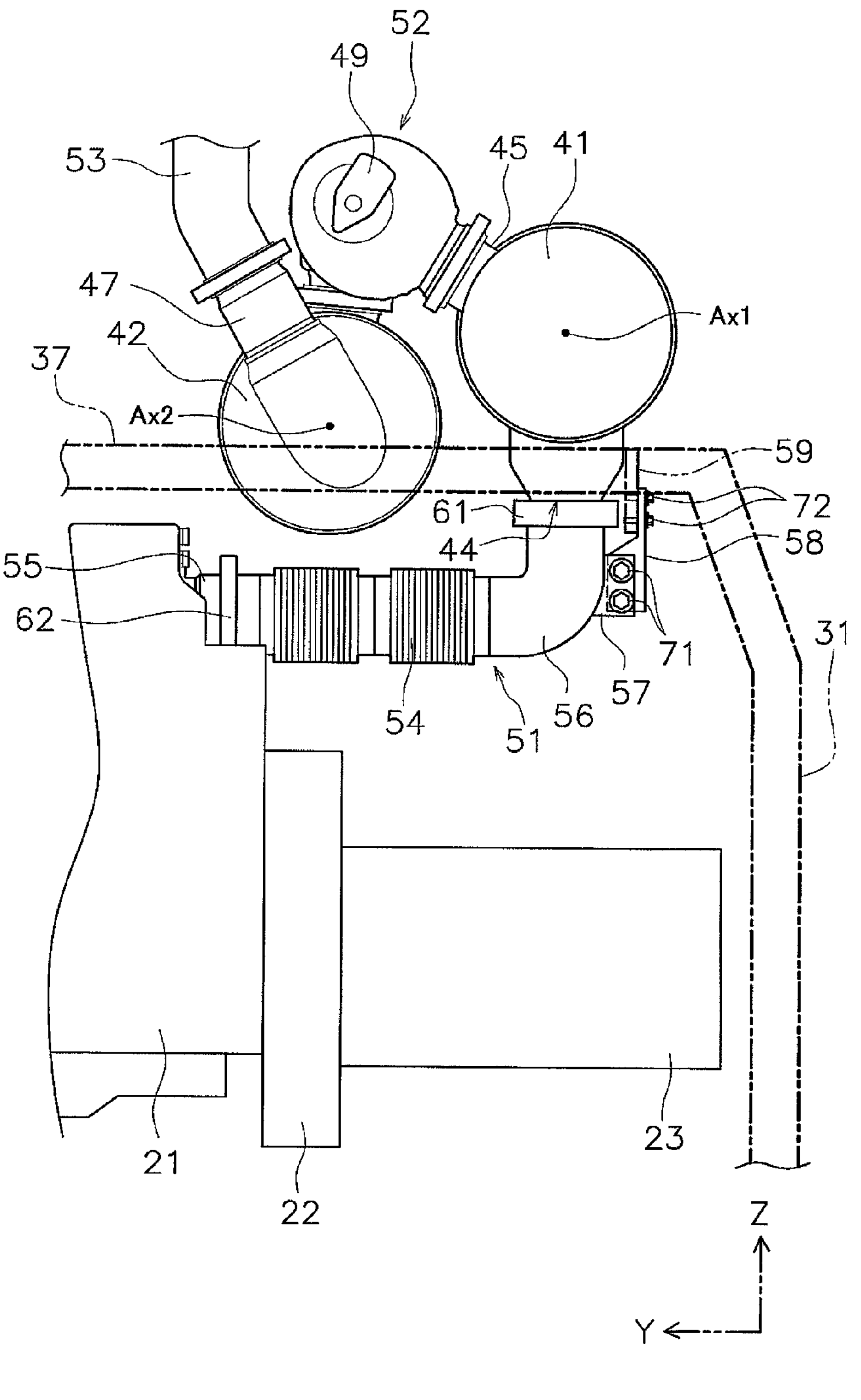
FIG. 4 is a diagram of a first exhaust treatment apparatus and a second exhaust treatment apparatus viewed from rear.

FIG. 4 is a diagram of the first exhaust treatment apparatus 41 and the second exhaust treatment apparatus 42 viewed from the rear. Here, for ease of understanding, the configuration of portions such as the bracket 43 is omitted in FIG. 4. As shown in FIG. 4, the top portion of the first exhaust treatment apparatus 41 is positioned above the top portion of the second exhaust treatment apparatus 42. The bottom portion of the first exhaust treatment apparatus 41 is positioned above the bottom portion of the second exhaust treatment apparatus 42. The bottom portion of the first exhaust treatment apparatus 41 is positioned below the top portion of the second exhaust treatment apparatus 42. The first exhaust treatment apparatus 41 is positioned above the hydraulic pump 23. The first exhaust treatment apparatus 41 is arranged above the beam members 36 and 37.

The second exhaust treatment apparatus 42 is an apparatus which treats the exhaust from the engine 21. The second exhaust treatment apparatus 42 is a selective catalytic reduction apparatus. Accordingly, the second exhaust treatment apparatus 42 selectively reduces nitrogen oxide NOx by hydrolyzing a reducing agent such as urea. The second exhaust treatment apparatus 42 substantially has a cylindrical shape. The second exhaust treatment apparatus 42 is arranged such that the center axis Ax2 of the second exhaust treatment apparatus 42 is along the front and back direction. Accordingly, the second exhaust treatment apparatus 42 is arranged such that the center axis Ax2 of the second exhaust treatment apparatus 42 is perpendicular with regard to the first direction. In other words, the second exhaust treatment apparatus 42 is arranged such that the longitudinal direction of the second exhaust treatment apparatus 42 is perpendicular with the first direction.

The second exhaust treatment apparatus 42 is arranged above the hydraulic pump 23. The bottom portion of the second exhaust treatment apparatus 42 is positioned below the upper surface of the engine 21. The bottom portion of the second exhaust treatment apparatus 42 is positioned below the beam members 36 and 37. The top portion of the second exhaust treatment apparatus 42 is positioned above the beam members 36 and 37.

The first exhaust treatment apparatus 41 has a first connecting port 44. As shown in FIG. 4, the hydraulic excavator 100 is provided with a first connecting pipe 51. As shown in FIG. 3, one end of the first connecting pipe 51 is connected with an exhaust port of the engine 21 via a supercharger 29. As shown in FIG. 4, the other end of the first connecting pipe 51 is connected with the first connecting port 44 of the first exhaust treatment apparatus 41. That is, the first connecting pipe 51 joins the engine 21 and the first exhaust treatment apparatus 41. The first connecting pipe 51 is fixed to the vehicle body frame 27. A fixing configuration for fixing the first connecting pipe 51 to the vehicle body frame 27 will be described later.

The first connecting port 44 is positioned at the bottom portion of the first exhaust treatment apparatus 41. Accordingly, the connection portion of the first connecting pipe 51 and the first exhaust treatment apparatus 41 is positioned directly below the first exhaust treatment apparatus 41. The first connecting pipe 51 is connected with the first exhaust treatment apparatus 41 via a spherical joint 61. As the spherical joint 61, a well-known technique according to, for example, US2011/0074150A1 may be used.

As shown in FIG. 4, the first connecting pipe 51 has a bellows portion 54 which is able to extend and contract. For example, the bellows portion 54 is configured by joining a plurality of bellows expanding and contracting joints. The bellows portion 54 is arranged horizontally. In detail, the bellows portion 54 extends in the vehicle width direction. The bellows portion 54 is arranged above the hydraulic pump 23. The bellows portion 54 is positioned below the beam members 36 and 37. A portion of the bellows portion 54 is positioned below the second exhaust treatment apparatus 42. That is, the first connecting pipe 51 is connected with the first exhaust treatment apparatus 41 by passing below the second exhaust treatment apparatus 42. Here, in a case where the bellows portion 54 is configured by a plurality of bellows expanding and contracting joints, the length of the bellows portion 54 is the total of the lengths of each of the bellows type expanding and contracting joints.

The length of the first connecting pipe 51 in the vehicle width direction is longer than the distance between the center of the first exhaust treatment apparatus 41 in the vehicle width direction and the center of the second exhaust treatment apparatus 42 in the vehicle width direction. In other words, the length of the first connecting pipe 51 in the vehicle width direction is longer than the distance in the vehicle width direction between the center axis Ax1 of the first exhaust treatment apparatus 41 and the center axis Ax2 of the second exhaust treatment apparatus 42.

The length of the bellows portion 54 is longer than the dimensions of the first exhaust treatment apparatus 41 in the vehicle width direction. That is, the length of the bellows portion 54 is longer than the diameter of the first exhaust treatment apparatus 41. The length of the bellows portion 54 is longer than the dimensions of the second exhaust treatment apparatus 42 in the vehicle width direction. That is, the length of the bellows portion 54 is longer than the diameter of the second exhaust treatment apparatus 42.

The first connecting pipe 51 has a first bent portion 55 and a second bent portion 56. As shown in FIG. 3, the first bent portion 55 joins the bellows portion 54 and the engine 21. As shown in FIG. 4, the first bent portion 55 is connected with the bellows portion 54 via a spherical joint 62. The second bent portion 56 joins the bellows portion 54 and the first connecting port 44. The second bent portion 56 is connected with the first connecting port 44 via the spherical joint 61.

As shown in FIG. 3 and FIG. 4, the first exhaust treatment apparatus 41 has a second connecting port 45. The second connecting port 45 protrudes upward and in an inclined manner in the vehicle width direction. The second exhaust treatment apparatus 42 has a third connecting port 46. As shown in FIG. 3, the third connecting port 46 is positioned at the top portion of the second exhaust treatment apparatus 42.

As shown in FIG. 3 and FIG. 4, the exhaust treatment unit 24 has a second connecting pipe 52. One end of the second connecting pipe 52 is connected with the second connecting port 45 of the first exhaust treatment apparatus 41. The other end of the second connecting pipe 52 is connected with the third connecting port 46 of the second exhaust treatment apparatus 42. That is, the second connecting pipe 52 connects the first exhaust treatment apparatus 41 and the second exhaust treatment apparatus 42. The second connecting pipe 52 is positioned above the second exhaust treatment apparatus 42. In addition, an aqueous urea injection apparatus 49 is attached to the second connecting pipe 52. The aqueous urea injection apparatus 49 injects aqueous urea into the second connecting pipe 52.

As shown in FIG. 4, the second exhaust treatment apparatus 42 has a fourth connecting port 47. The fourth connecting port 47 protrudes upward in an inclined manner. The hydraulic excavator 100 is provided with a third connecting pipe 53. The third connecting pipe 53 is connected with the fourth connecting port 47. The upper portion of the third connecting pipe 53 projects upward from the engine hood 17.

The engine 21, the first connecting pipe 51, the first exhaust treatment apparatus 41, the second connecting pipe 52, the second exhaust treatment apparatus 42, and the third connecting pipe 53 are connected in series in this order. Accordingly, the exhaust from the engine 21 is sent to the first exhaust treatment apparatus 41 by being passed through the first connecting pipe 51. In the first exhaust treatment apparatus 41, particulate matter is mostly reduced from in the exhaust. Next, the exhaust is sent to the second exhaust treatment apparatus 42 by being passed the second connecting pipe 52. In the second exhaust treatment apparatus 42, NOx is mostly reduced. Subsequently, the purified exhaust is discharged to the outside by being passed through the third connecting pipe 53.

The bracket 43 joins the second exhaust treatment apparatus 42 and the first exhaust treatment apparatus 41. Due to this, the second exhaust treatment apparatus 42, the first exhaust treatment apparatus 41, and the bracket 43 are integrated. The bracket 43 is fixed to the vehicle body frame 27. Due to this, the exhaust treatment unit 24 is fixed to the vehicle body frame 27. The bracket 43 is attached to the vehicle body frame 27 so as to be able to be attached and detached using a fixing means such as a bolt. Accordingly, it is possible to detach the exhaust treatment unit 24 from the vehicle by detaching the bracket 43 from the vehicle body frame 27.

In addition, it is possible to detach the first exhaust treatment apparatus 41 from the vehicle by detaching the first exhaust treatment apparatus 41 from the bracket 43. In this case, the first connecting pipe 51 is detached from the first connecting port 44. The second connecting pipe 52 is detached from the second connecting port 45. In addition, the first exhaust treatment apparatus 41 is detached from the bracket 43. The first exhaust treatment apparatus 41 is moved upward by being hoisted by a crane or the like. Due to this, it is possible to detach the first exhaust treatment apparatus 41 from the vehicle.

Figure 5:
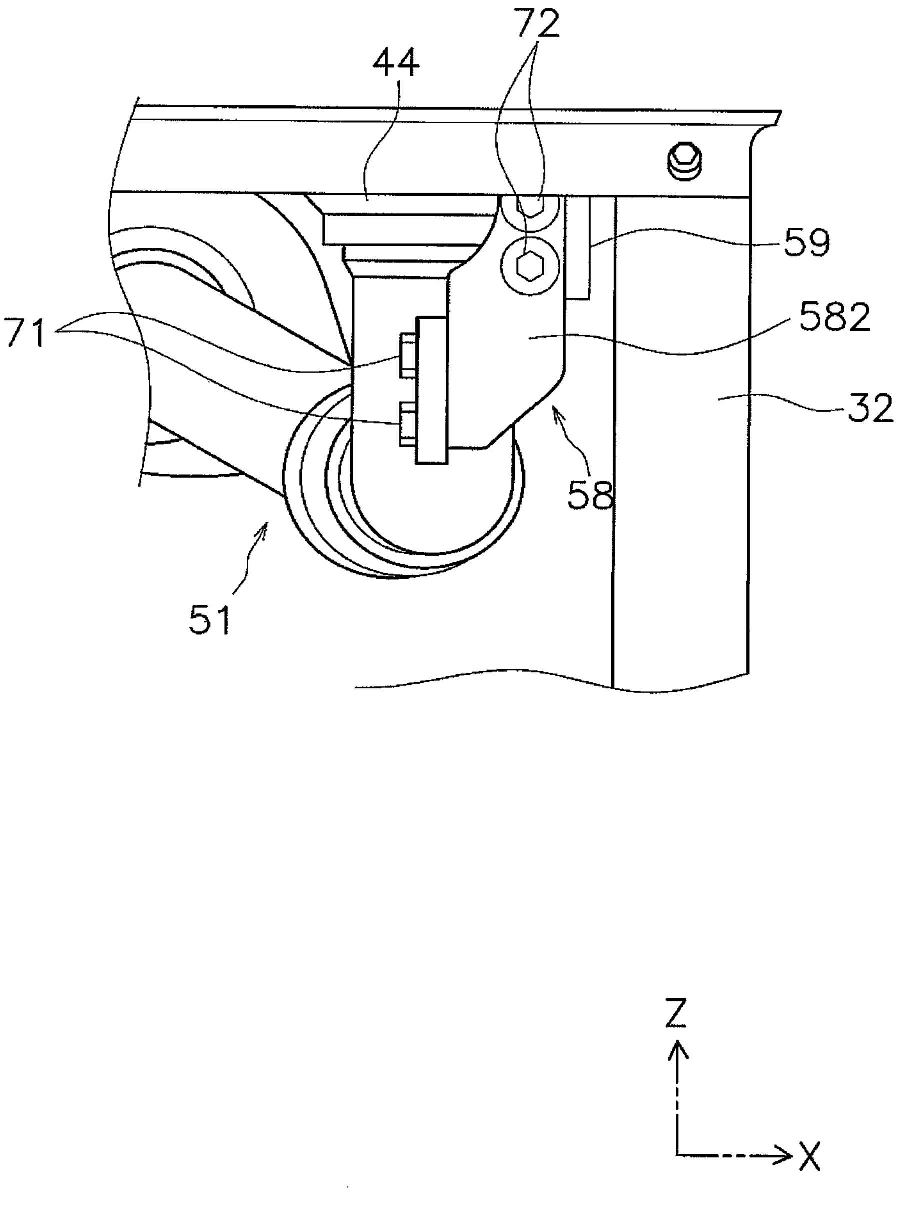
FIG. 5 is a lateral view of a configuration of the surroundings of a fixing portion of a first connecting pipe.
Figure 6:
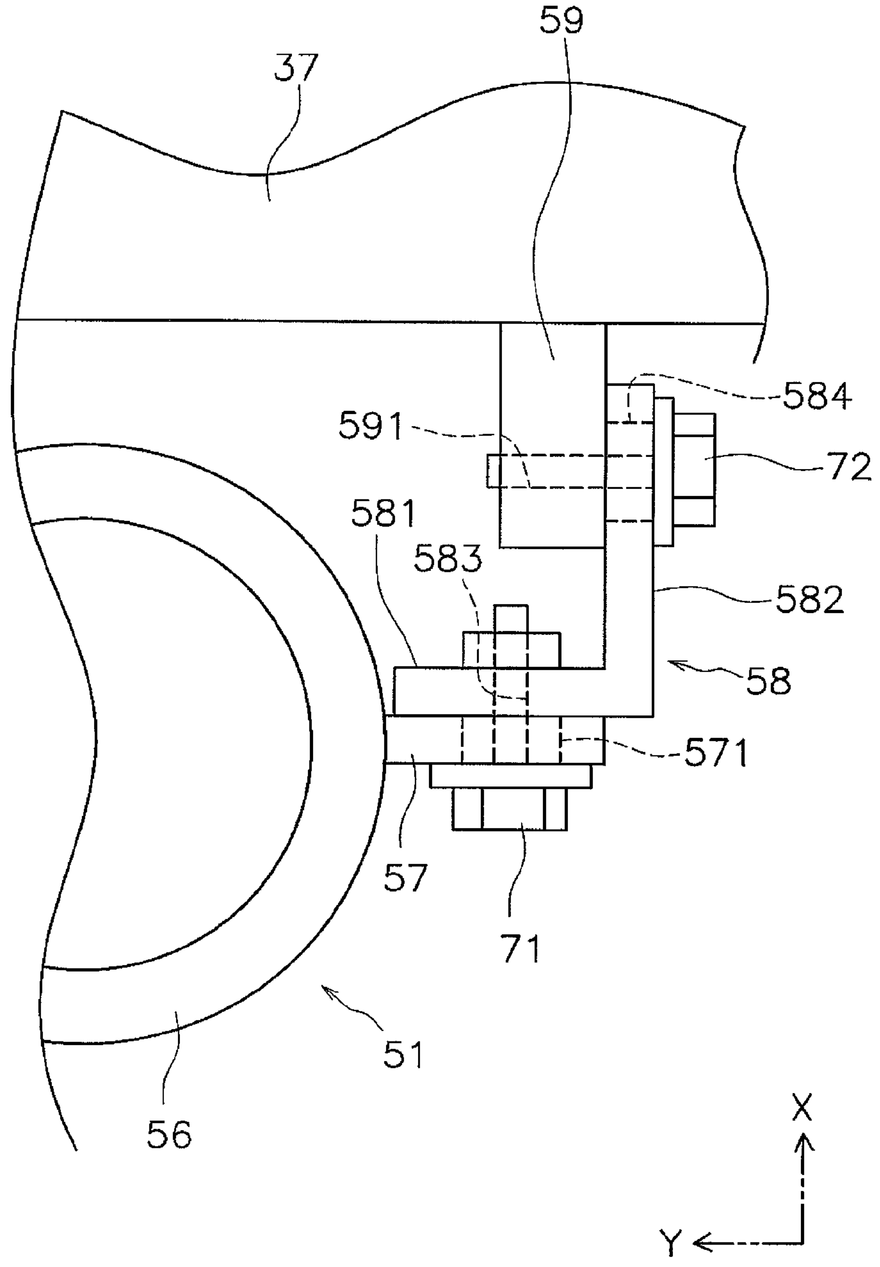
FIG. 6 is a plan view of the configuration of the surroundings of the fixing portion of a first connecting pipe.

Next, the fixing configuration, which is for fixing the first exhaust treatment apparatus 51 to the vehicle body frame 27, will be described. As shown in FIG. 4, the first connecting pipe 51 includes a fixing portion 57 which is fixed to the vehicle body frame 27. In addition, the hydraulic excavator 100 is provided with an attachment member 58 for attaching the fixing portion 57 to the vehicle body frame 27. FIG. 5 is a lateral view of a configuration of the surroundings of the fixing portion 57 of the first connecting pipe 51. FIG. 6 is a plan view of the configuration of the surroundings of the fixing portion 57 of the first connecting pipe 51.

As shown in FIG. 4, the fixing portion 57 is positioned in the first connecting pipe 51 between the bellows portion 54 and the first exhaust treatment apparatus 41. The fixing portion 57 is positioned below the connecting portion of the first connecting pipe 51 and the first exhaust treatment apparatus 41. The fixing portion 57 is positioned below the first beam member 36 and the second beam member 37. In detail, the fixing portion 57 is provided at the second bent portion 56. The fixing portion 57 has a plate shape which protrudes from the second bent portion 56. The fixing portion 57 extends in the vehicle width direction.

The attachment member 58 is a member for fixing the fixing portion 57 to the vehicle body frame 27. The attachment member 58 is separate from the fixing portion 57. In addition, the attachment member 58 is separate from the vehicle body frame 27. As shown in FIG. 6, the attachment member 58 includes a first plate portion 581 and a second plate portion 582. The attachment member 58 has a bent shape between the first plate portion 581 and the second plate portion 582. The first plate portion 581 is fixed by the fixing portion 57. The first plate portion 581 extends in the vehicle width direction in the same manner as the fixing portion 57.

The second plate portion 582 is fixed to the vehicle body frame 27. In detail, the second plate portion 582 is fixed to an attachment portion 59 which protrudes from the vehicle body frame 27. The second plate portion 582 extends in the front and back direction. The attachment portion 59 protrudes downward from the second beam member 37. The attachment member 58 is fixed to the second beam member 37 via the attachment portion 59. Accordingly, the fixing portion 57 and the first exhaust treatment apparatus 41 are both attached to the second beam member 37.

The fixing portion 57 is fixed to the first plate portion 581 by a bolt 71. The first plate portion 581 includes a hole 583 through which the bolt 71 passes. In addition, the fixing portion 57 includes a first hole 571 through which the bolt 71 passes. The diameter of the first hole 571 is larger than the shaft diameter of the bolt 71. Due to this, the first plate portion 581 and the fixing portion 57 are configured to be attached to each other so as to be able to be positionally adjusted.

The second plate portion 582 is fixed to the attachment portion 59 by a bolt 72. The attachment portion 59 includes a hole 591 through which the bolt 72 passes. In addition, the second plate portion 582 includes a second hole 584 through which the bolt 72 passes. The diameter of the second hole 584 is larger than the shaft diameter of the bolt 72. Due to this, the second plate portion 582 and the attachment portion 59 are configured to be attached to each other so as to be able to be positionally adjusted.

The hydraulic excavator 100 according to the present embodiment is provided with the following features.

Figure 7:
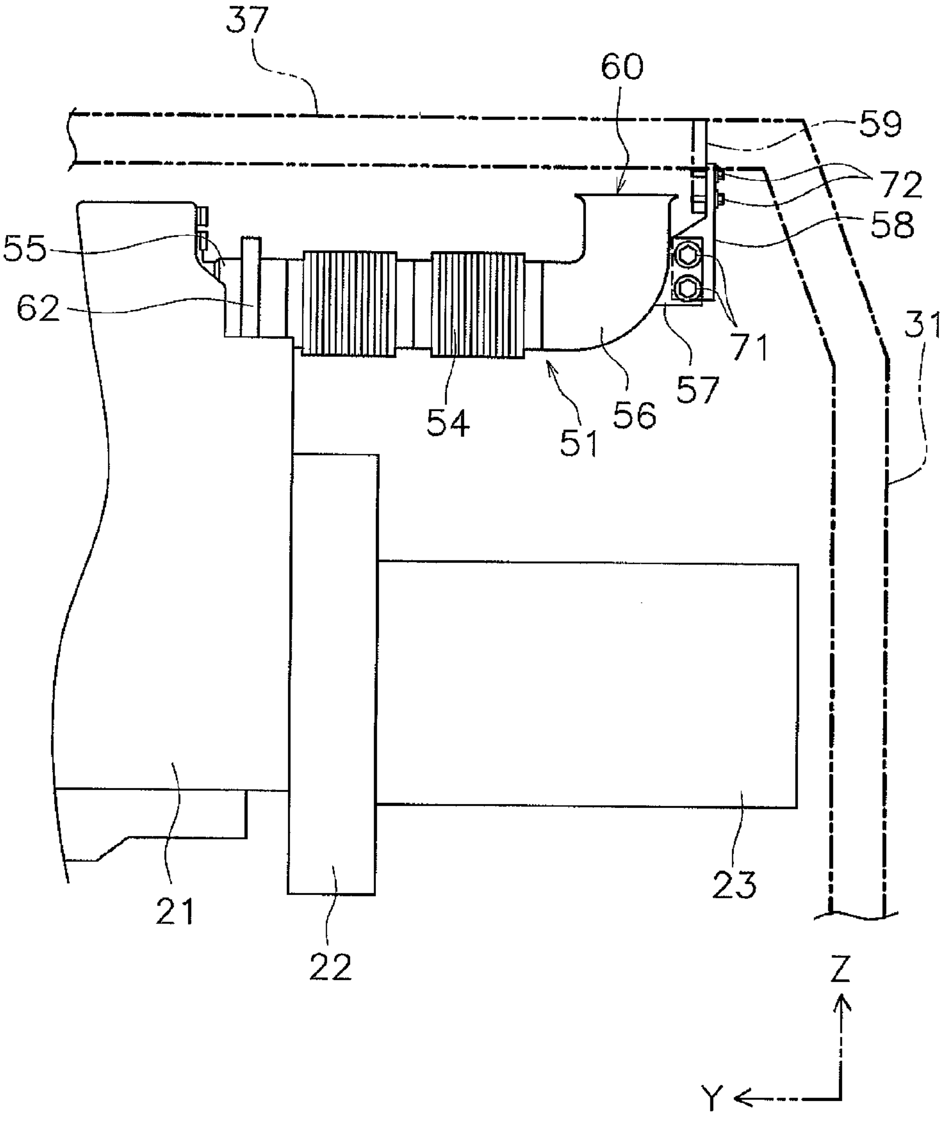
FIG. 7 is a diagram illustrating a state where an exhaust treatment unit is detached from the vehicle body frame.

It is possible to absorb the difference in vibration between the engine 21 and the vehicle body frame 27 using the bellows portion 54 of the first connecting pipe 51. Due to this, the load on the first connecting pipe 51 is reduced. In addition, the first connecting pipe 51 is fixed to the vehicle body frame 27 at the fixing portion 57 between the bellows portion 54 and the first exhaust treatment apparatus 41. As a result, as shown in FIG. 7, an end portion 60 of the first connecting pipe 51 is held at a constant position even in a state where the end portion 60 of the first connecting pipe 51 is not connected with the first exhaust treatment apparatus 41. Due to this, the operations where the first connecting pipe 51 is attached and detached with regard to the first exhaust treatment apparatus 41 are easy.

The connection portion of the first connecting pipe 51 and the first exhaust treatment apparatus 41 is positioned below the first exhaust treatment apparatus 41. Accordingly, it is possible to detach the first exhaust treatment apparatus 41 from the vehicle by lifting up the first exhaust treatment apparatus 41 while maintaining a state where the first connecting pipe 51 is attached to the vehicle body frame 27.

In addition, since the first connecting pipe 51 is attached to the vehicle body frame 27 by the fixing portion 57, the position of the end portion 60 of the first connecting pipe 51 is held in a constant manner even when the first exhaust treatment apparatus 41 is detached from the first connecting pipe 51. Due to this, it is possible to improve the operability during maintenance of the first exhaust treatment apparatus 41. In the same manner, the position of the end portion 60 of the first connecting pipe 51 is held in a constant manner even when the exhaust treatment unit 24 is detached from the vehicle body frame 27. Due to this, it is possible to improve the operability during maintenance of the exhaust treatment unit 24.

The fixing portion 57 is positioned below the connecting portion of the first connecting pipe 51 and the first exhaust treatment apparatus 41. Accordingly, the distance from the fixing portion 57 up to the end portion 60 of the first connecting pipe 51 is short. As a result, it is easier to hold the position of the end portion 60 of the first connecting pipe 51 in a constant manner.

The fixing portion 57 and the first exhaust treatment apparatus 41 are both attached to the second beam member 37. As a result, it is possible to reduce errors at the position between the end portion 60 of the first connecting pipe 51 and the first exhaust treatment apparatus 41. In addition, since the distance from the fixing portion 57 up to the end portion 60 of the first connecting pipe 51 which is connected with the first exhaust treatment apparatus 41 is short, it is easier to hold the position of the end portion 60 of the first connecting pipe 51 in a constant manner.

It is possible to adjust the position of the fixing portion 57 in a plurality of directions by adjusting the position of the first plate portion 581 and adjusting the position of the second plate portion 582. In detail, it is possible to adjust the relative position of the fixing portion 57 of the first connecting pipe 51 with regard to the first plate portion 581 in the up and down direction and the vehicle width direction. In addition, it is possible to adjust the relative position of the second plate portion 582 with regard to the attachment portion 59 of the vehicle body frame 27 in the up and down direction and the front and back direction. As a result, there is a high degree of freedom in the positional alignment of the end portion 60 of the first connecting pipe 51. Due to this, the operations where the first connecting pipe 51 is attached and detached with regard to the first exhaust treatment apparatus 41 are easier.

The engine 21, the second exhaust treatment apparatus 42, and the first exhaust treatment apparatus 41 are arranged to line up a planar view in this order in the first direction. That is, the first exhaust treatment apparatus 41 is positioned to be further from the engine 21 than the second exhaust treatment apparatus 42. Accordingly, it is possible to ensure that the lengths of the first connecting pipe 51 and the bellows portion 54 are large. Due to this, it is possible to further reduce the load on the first connecting pipe 51 due to vibration. In addition, since the position of the end portion 60 of the first connecting pipe 51 is held by the fixing portion 57 and the attachment member 58, it is possible to effectively maintain the operability when attaching and detaching the first connecting pipe 51 with regard to the first exhaust treatment apparatus 41 even when the lengths of the first connecting pipe 51 and the bellows portion 54 are large.

The first connecting pipe 51 passes below the exhaust treatment unit 24. Accordingly, when the exhaust treatment unit 24 is detached from the vehicle by lifting up of the exhaust treatment unit 24, it is difficult for the first connecting pipe 51 to interfere with the exhaust treatment unit 24 even in a state where the first connecting pipe 51 remains attached to the vehicle body frame 27.

Above, an embodiment of the present invention is described, but the present invention is not limited to the embodiments described above and various modifications are possible in a scope which does not depart from the scope of the present invention.

The first exhaust treatment apparatus 41 is not limited to a cylindrical shape or the like and may have another shape, such as an elliptical shape or a rectangular shape. The second exhaust treatment apparatus 42 is not limited to a cylindrical shape or the like and may have another shape, such as an elliptical shape or a rectangular shape.

The first direction may be other directions without being limited to the vehicle width direction. That is, the first exhaust treatment apparatus 41 and the second exhaust treatment apparatus 42 may be arranged to line up in a direction which is different to the vehicle width direction. For example, the first direction may be the vehicle front and back direction. That is, the first exhaust treatment apparatus 41 and the second exhaust treatment apparatus 42 may be arranged to line up in the vehicle front and back direction.

The first exhaust treatment apparatus 41 may be supported by any of the column members 31 to 35. The second exhaust treatment apparatus 42 may be supported by any of the column members 31 to 35. The vehicle body frame which supports the first exhaust treatment apparatus 41 and the second exhaust treatment apparatus 42 is not limited to a frame for supporting the outer cover 28. For example, a dedicated vehicle body frame may be provided for supporting the first exhaust treatment apparatus 41 and the second exhaust treatment apparatus 42.

The bellows portion may be provided over the entirety of the first connecting pipe 51 rather than at a portion of the first connecting pipe 51. The length of the bellows portion may be longer than the length described above. Alternatively, the length of the bellows portion may be shorter than the length described above. However, from the point of view of improving the vibration absorbing force, it is preferable that the length of the bellows portion be as long as possible.

The first exhaust treatment apparatus 41 may be arranged below the second exhaust treatment apparatus 42. The second exhaust treatment apparatus 42 may be arranged above the beam members 36 and 37.

The fixing portion 57 of the first connecting pipe 51 may be provided in the first connecting pipe 51 at a portion other than the second bent portion 56. However, from the point of view of stably holding the end portion 60 of the first connecting pipe 51, it is preferable that the fixing portion 57 be provided at a position which is as close as possible to the end portion 60 of the first connecting pipe 51.

The fixing portion 57 of the first connecting pipe 51 may be fixed to a portion in the vehicle body frame 27 other than the second beam member 37. For example, the fixing portion 57 of the first connecting pipe 51 may be fixed to the column member 31.

The fixing portion 57 of the first connecting pipe 51 may be attached directly to the vehicle body frame 27 without using the attachment member 58. However, from the point of view of improving the degree of freedom in the positional alignment of the first connecting pipe 51, it is preferable that the fixing portion 57 be attached to the vehicle body frame 27 via the attachment member 58 as in the embodiment described above.

The first exhaust treatment apparatus 41 may be another type of exhaust treatment apparatus without being limited to a diesel particulate filter apparatus. The second exhaust treatment apparatus 42 may be another type of exhaust treatment apparatus without being limited to a selective catalytic reduction apparatus.

According to the present invention, it is possible to provide a hydraulic excavator where it is possible to reduce the load on a connecting pipe due to vibration and where it is possible to eliminate difficulties when attaching and detaching the connecting pipe with regard to an exhaust treatment apparatus.

The invention claimed is:

1. A hydraulic excavator comprising:
- an engine;
- a revolving frame supporting the engine;
- a vehicle body frame including a plurality of column members disposed upright on the revolving frame;
- a first exhaust treatment apparatus supported by the vehicle body frame, the first exhaust treatment apparatus being configured to treat exhaust from the engine; and
- a connecting pipe connecting the engine and the first exhaust treatment apparatus, at least a portion of the connecting pipe including a bellows portion configured to be extendable and contractable,
- the connecting pipe including a fixing portion fixed to the vehicle body frame, and
- the fixing portion being positioned on the connecting pipe between the bellows portion and the first exhaust treatment apparatus.

2. The hydraulic excavator according to claim 1, wherein
- a connecting portion of the connecting pipe and the first exhaust treatment apparatus are positioned below the first exhaust treatment apparatus.

3. The hydraulic excavator according to claim 2, wherein
- the fixing portion is positioned below the connecting portion.

4. The hydraulic excavator according to claim 2, wherein
- the fixing portion and the first exhaust treatment apparatus are attached to a common member of the vehicle body frame.

5. The hydraulic excavator according to claim 2, wherein
- the vehicle body frame further includes a beam member, and
- the fixing portion and the first exhaust treatment apparatus are fixed to the beam member.

6. The hydraulic excavator according to claim 2, further comprising:
- an attachment member configured to attach the fixing portion to the vehicle body frame, the attachment member including a first plate portion and a second plate portion, and the attachment member having a shape bent between the first plate portion and the second plate portion,
- the first plate portion and the fixing portion are configured to be attached to each other so as to be positionally adjusted, and
- the second plate portion and the vehicle body frame are configured to be attached to each other so as to be positionally adjusted.

7. The hydraulic excavator according to claim 2, further comprising:
- a second exhaust treatment apparatus supported by the vehicle body frame, the second exhaust treatment apparatus being configured to treat exhaust from the engine,
- the engine, the second exhaust treatment apparatus, and the first exhaust treatment apparatus being arranged to line up in order along a first direction on a horizontal plane as seen in a planar view.

8. The hydraulic excavator according to claim 2, wherein
- the first exhaust treatment apparatus is a diesel particulate filter apparatus.

9. The hydraulic excavator according to claim 1, wherein
- the fixing portion and the first exhaust treatment apparatus are attached to a common member of the vehicle body frame.

10. The hydraulic excavator according to claim 1, wherein
- the vehicle body frame further includes a beam member, and the fixing portion and the first exhaust treatment apparatus are fixed to the beam member.

11. The hydraulic excavator according to claim 1, further comprising:

an attachment member configured to attach the fixing portion to the vehicle body frame, the attachment member including a first plate portion and a second plate portion, and the attachment member having a shape bent between the first plate portion and the second plate portion, the first plate portion and the fixing portion are configured to be attached to each other so as to be positionally adjusted, and the second plate portion and the vehicle body frame are configured to be attached to each other so as to be positionally adjusted.

12. The hydraulic excavator according to claim 1, further comprising:

a second exhaust treatment apparatus supported by the vehicle body frame, the second exhaust treatment apparatus being configured to treat exhaust from the engine, the engine, the second exhaust treatment apparatus, and the first exhaust treatment apparatus being arranged to line up in order along a first direction on a horizontal plane as seen in a planar view.

13. The hydraulic excavator according to claim 12, wherein the connecting pipe is connected with the first exhaust treatment apparatus by passing below the second exhaust treatment apparatus.

14. The hydraulic excavator according to claim 12, further comprising:

a bracket configured to attach the first exhaust treatment apparatus to the vehicle body frame, the first exhaust treatment apparatus and the second exhaust treatment apparatus being attached to the vehicle body frame in an integral manner via the bracket.

15. The hydraulic excavator according to claim 12, wherein the first exhaust treatment apparatus and the second exhaust treatment apparatus are arranged to line up in a state where longitudinal directions of the first exhaust treatment apparatus and the second exhaust treatment apparatus are perpendicular to the first direction, and a length of the bellows portion is larger than a dimension of the first exhaust treatment apparatus in the first direction or a dimension of the second exhaust treatment apparatus in the first direction.

16. The hydraulic excavator according to claim 15, wherein the second exhaust treatment apparatus has a cylindrical shape, and the length of the bellows portion is larger than a diameter of the second exhaust treatment apparatus.

17. The hydraulic excavator according to claim 15, wherein the first exhaust treatment apparatus has a cylindrical shape, and the length of the bellows portion is larger than a diameter of the first exhaust treatment apparatus.

18. The hydraulic excavator according to claim 12, wherein the first exhaust treatment apparatus and the second exhaust treatment apparatus are arranged to line up in a state where longitudinal directions of the first exhaust treatment apparatus and the second exhaust treatment apparatus are perpendicular to the first direction, and a length of the connecting pipe along the first direction is larger than a distance between a center of the first exhaust treatment apparatus and a center of the second exhaust treatment apparatus along the first direction.

19. The hydraulic excavator according to claim 12, wherein the second exhaust treatment apparatus is a selective catalytic reduction apparatus.

20. The hydraulic excavator according to claim 1, wherein the first exhaust treatment apparatus is a diesel particulate filter apparatus.

* * * * *